UNITED STATES PATENT OFFICE.

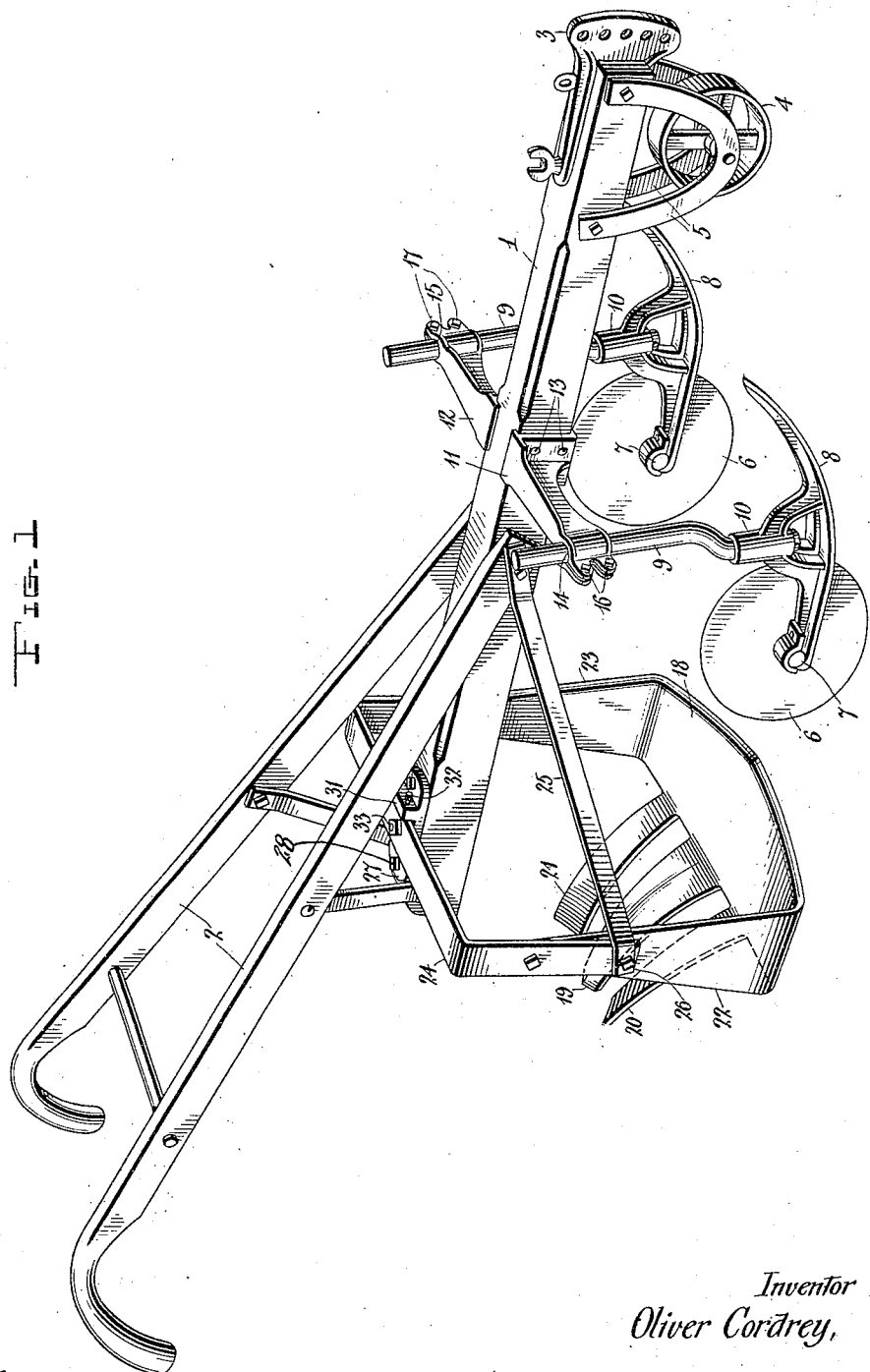

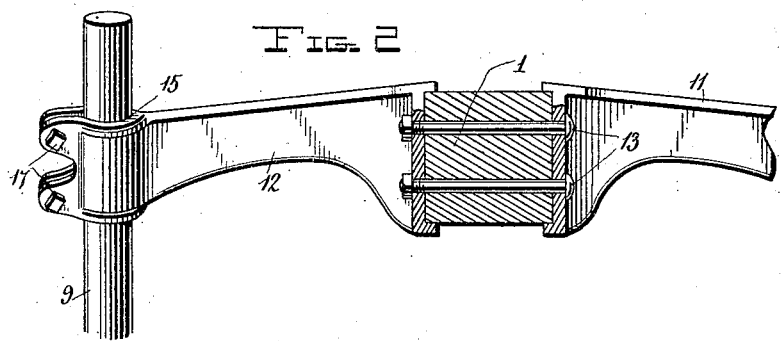
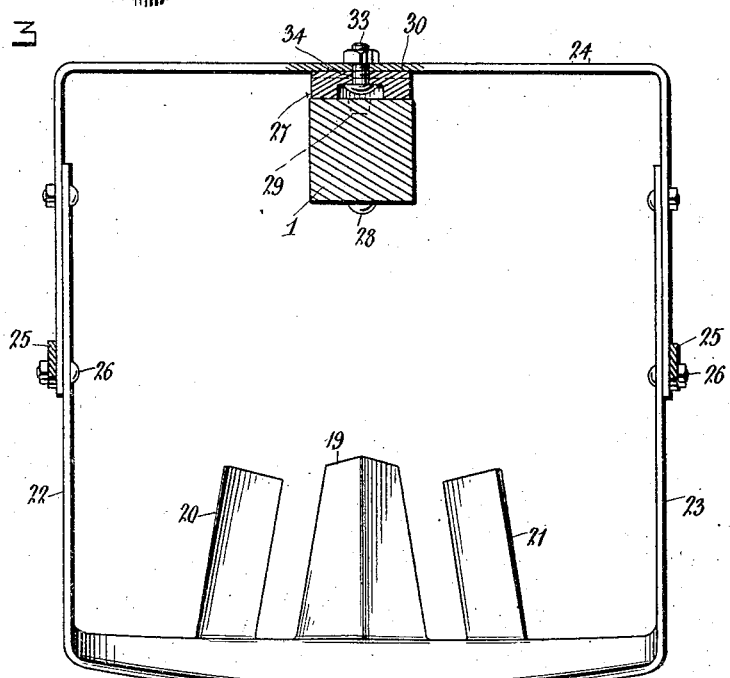
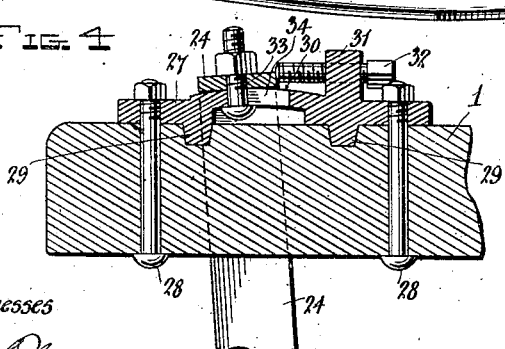
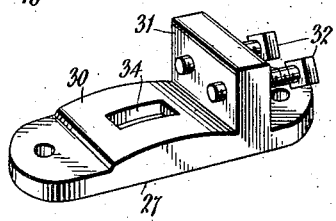

OLIVER CORDREY, OF LAUREL, DELAWARE.

POTATO-DIGGER.

1,239,354.  Specification of Letters Patent.  Patented Sept. 4, 1917.

Application filed November 7, 1914. Serial No. 870,904.

*To all whom it may concern:*

Be it known that I, OLIVER CORDREY, a citizen of the United States, residing at Laurel, in the county of Sussex and State of Delaware, have invented new and useful Improvements in Potato-Diggers, of which the following is a specification.

My present invention relates to improvements in potato diggers, and its objects are to provide an improved implement of this character which will require less power to draw it through the soil than heretofore required, which will be self-guiding, that is, capable of remaining in upright position and maintaining its depth and direction without requiring the use of ground wheels, which embodies a scoop of improved construction, insuring lifting of all the potatoes, which embodies simple and efficient means for adjusting the depth of the scoop in the soil, and which embodies improved means for adjustably mounting the cutting disks or knives and the runners.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a perspective view of a potato digger constructed in accordance with the present invention;

Fig. 2 represents a transverse section through the beam showing the brackets for mounting the cutting disks or knives and runners;

Fig. 3 represents a transverse section through the beam in advance of the scoop;

Fig. 4 represents a longitudinal section through the rear portion of the beam and the adjusting means for the scoop;

Fig. 5 is a detail perspective view of the adjustable bracket for the scoop.

Similar parts are designated by the same reference characters in the several views.

The preferred embodiment of the invention is shown in the accompanying drawing and will be hereinafter described in detail, but it will be understood that the invention is not restricted to the precise construction shown, as equivalent constructions within the scope of the annexed claims may be employed in carrying the invention into effect.

In the present instance, the implement comprises a beam 1 having handles 2 whereby it may be manipulated in entering the soil at the beginning of a row and leaving the soil at the end of a row, and these handles may also be used, if desired, during the passage of the implement along each row. A clevis or draft device 3 is attached to the forward end of the beam and provides means by which the implement can be drawn through the soil. A wheel 4 is mounted in brackets 5 toward the forward end of the beam and serves to support the forward end of the implement in turning the same at the end of a row or in otherwise handling the implement when the same is out of the soil, this wheel being ordinarily inoperative during the passage of the implement along the row. A pair of cutting knives 6 are provided, those shown being in the form of disks which are rotatable on axes 7, these cutting knives serving to sever the stems of the potato vines. Runners 8 are also provided in advance of the disks and perform the function of pressing the vines down close to the ground surface preparatory to the cutting thereof by the disks, and they also serve to support and steady the forward portion of the implement as the latter advances. In the present instance, the axes or pivots 7 for the cutting disks are mounted at the rear ends of the runners, and the runners and cutting disks are connected to upwardly extending shanks 9, the runners being preferably formed with sockets 10 to receive the lower ends of the shanks and to swivel therefrom, thereby enabling the runners and the disks to adjust themselves according to the direction of travel of the implement.

According to the present invention, a pair of brackets 11 and 12 are secured to opposite sides of the beam 1 and serve to support the shanks 9 for the runners and cutting disks. In the present instance, the brackets 11 and 12 are similar in construction, they being bolted to the opposite sides of the beam by the bolts 13 and their outer ends are split and formed into sockets 14 and 15 to receive the upper ends of the shanks, the latter being clamped in the proper adjusted positions in the sockets by the clamping screws or bolts 16 and 17. The sockets 14 and 15 are both inclined upwardly and rearwardly, preferably at the same inclination.

A scoop is arranged toward the rear of the beam, this scoop embodying, in the present instance, a blade 18 which is adapted to pass through the soil beneath the potatoes, and means are provided for lifting the potatoes to the surface of the ground. In the present instance, a central upwardly and rearwardly extending lifting prong 19 proceeds from the rear edge of the blade 18, and a pair of lateral lifting prongs 20 and 21 extend upwardly and rearwardly from the rear edge of the blade 18 at opposite sides of the prong 19, the lifting prongs 20 and 21 being preferably formed with a twist toward their upper rear ends whereby the latter slope inwardly or toward the central prong and thereby operate to lift the potatoes from the sides of the row and to bring them to the surface of the ground, substantially in line with the center of the row. The blade 18 with the lifting prong 19 is supported by the side members 22 and 23, the latter being fixed to a yoke 24. Braces 25 are pivotally connected to the yoke 24 at the points 26 and they are bolted or otherwise fixed to the beam toward the front of the scoop. The yoke 24 overlies the beam, and the present invention provides means for adjusting the inclination of the blade 18 whereby the depth of the blade in the soil may be adjusted exactly to requirements. In the present instance, a bracket 27 is secured by the bolts 28 to the top of the beam, the bracket being positioned on the beam by the lugs 29 which rest in recesses in the top of the beam, and the intermediate or central portion of the yoke 24 rests on a convex portion 30 of the bracket, the radius of the convex portion being preferably concentric with the pivot points 26. The bracket 27 is formed at the forward side of the yoke 24 with a lug 31 which contains one or more set-screws 32, two of these screws being shown in the present instance and they abut at their rear ends against the yoke 24. By turning the screws in one direction or another, the yoke 24 is positioned at different points in a forward and rearward direction on the convex portion 30 of the bracket, the blade 18 being thereby tilted at different inclinations, and variations in the pitch of the blade thereby produced cause the blade to enter the soil to a correspondingly greater or less extent. The yoke 24 which positions the blade or scoop is preferably secured or fixed in the different adjusted positions by a bolt 33 which extends through the yoke and through a slot 34 formed in the convex portion of the bracket.

In operation, the implement rests at its forward end on the runners 8, and the blade 18 of the scoop enters the soil until it has a pitch relatively to the horizontal which corresponds to the direction of travel or movement of the implement, and by adjusting the pitch or inclination of the blade of the scoop accurately as provided for by the present invention, the implement will maintain its depth and direction and will also remain in upright position as it proceeds along the row, it being usually unnecessary for the operator to assist in guiding the implement by the handles, the adjusting of the implement to obtain this result being assisted by setting the runners 8 at the desired height. By providing the lateral lifting prongs, lifting of all the potatoes in the row to the surface and in a compact row is also insured.

I claim as my invention:—

1. A potato digger comprising, in combination, a frame having a draft device at the forward end thereof, runners connected to and supporting the frame, a scoop, and means for adjusting the inclination of the scoop whereby the latter will maintain an even depth in the soil and the implement will be self-guiding.

2. A potato digger comprising, in combination, a frame having a draft device at the forward end thereof, runners connected to and supporting the frame, a scoop capable of tilting relatively to the frame to vary the angle which it presents to the soil and having a yoke extending up to the frame, a bracket fixed to the frame, a set-screw carried by the bracket and coöperative with the yoke of the scoop to adjust the latter at different inclinations, and means for securing the yoke and bracket in fixed relation to maintain the desired adjustment.

3. In a potato digger, the combination of a beam having a draft device at the forward end thereof, a pair of supporting runners arranged at opposite sides of the beam and independently adjustable vertically with respect thereto, and a scoop attached to the beam in rear of the runners and adjustable to different inclinations relatively to the beam whereby the scoop and the runners may be adjusted to automatically guide the implement.

In testimony whereof I have hereunto set my hand in presence of two subscribing witnesses.

OLIVER CORDREY.

Witnesses:
JNO. E. WHITE,
CHARLES C. OLIPHANT.